(12) United States Patent
Stenvall

(10) Patent No.: US 7,523,819 B2
(45) Date of Patent: Apr. 28, 2009

(54) APPARATUS FOR CONTROLLING TWO FRICTION CLUTCHES OF A VEHICLE TRANSMISSION

(75) Inventor: Lars Stenvall, Ljungskile (SE)

(73) Assignee: Ford Global Technologies, LLC, Dearborn, MI (US)

( * ) Notice: Subject to any disclaimer, the term of this patent is extended or adjusted under 35 U.S.C. 154(b) by 374 days.

(21) Appl. No.: 11/550,201

(22) Filed: Oct. 17, 2006

(65) Prior Publication Data

US 2007/0125191 A1    Jun. 7, 2007

(30) Foreign Application Priority Data

Oct. 18, 2005    (EP)    ................... 05109686

(51) Int. Cl.
*F16D 21/08*    (2006.01)
(52) U.S. Cl. ................ 192/87.15; 192/48.8; 192/87.11; 192/91 A; 192/110 B
(58) Field of Classification Search ............. 192/87.11, 192/87.15, 48.8, 85 CA, 91 A, 98, 110 B
See application file for complete search history.

(56) References Cited

U.S. PATENT DOCUMENTS

| 6,588,292 B2 * | 7/2003 | Yamasaki et al. ............. 74/340 |
| 6,997,298 B2 * | 2/2006 | Janson .................... 192/48.91 |
| 7,370,745 B2 * | 5/2008 | Lindenschmidt et al. . 192/87.11 |
| 2005/0034955 A1 * | 2/2005 | Meinhard et al. ........... 192/112 |
| 2007/0193843 A1 * | 8/2007 | Uhler et al. ................ 192/48.8 |

FOREIGN PATENT DOCUMENTS

| SE | 454 073 | 3/1988 |
| SE | 515 756 | 10/2001 |

* cited by examiner

*Primary Examiner*—David D. Le
(74) *Attorney, Agent, or Firm*—David B. Kelley

(57) ABSTRACT

An arrangement for controlling engagement and disengagement of two dry plate friction clutches (5,8) in a transmission having two concentric input shafts (3,6) comprising one release bearing (22,23) for each clutch on the transmission side of the clutches and one release bearing (36,37) for each clutch on the engine side of the clutches. The release bearing on the transmission side controls the operation of the release bearings on the engine side for disengagement of the clutches by means of intermediate push rods (28,29) extending through openings in a rotating element (7) connected to one of the clutches.

5 Claims, 2 Drawing Sheets

APPARATUS FOR CONTROLLING TWO FRICTION CLUTCHES OF A VEHICLE TRANSMISSION

FIELD OF THE INVENTION

The present invention relates to an arrangement for controlling engagement and disengagement of clutches in a vehicle transmission, and more particularly to an apparatus for controlling a first dry plate friction clutch driveable connected to a second transmission shaft journalled concentric with and surrounding the first transmission shaft.

BACKGROUND OF THE INVENTION

One type transmission which has two concentric input shafts and two clutches are those called power shift transmissions, wherein one clutch is engages in all even gear speeds and the other clutch is engaged in all uneven gear speeds. When shifting from one gear speed to the next gear speed this next gear speed is pre-selected and the actual shifting is initiated by releasing the presently engaged clutch and engaging the presently disengaged clutch.

Usually power shift transmission of this type have hydraulically operated multiple wet plate clutches. Pressure from a hydraulic pump keeps the clutches engaged one at the time and the pressure is redirected from one clutch to the other when shifting takes place. When the engine driving the transmission is not running then the clutches are disengaged. During driving one of the clutches is always biased by the hydraulic pressure from the pump to the engaged position which means that some engine power from the engine driving the transmission is consumed by the hydraulic pump thereby decreasing the over-all efficiency of the vehicle drive line compared with a drive line using dry plate friction clutches.

Problems to mechanically alternately engage and disengage two dry plate friction clutches running at different rotational speeds as in the case in a power shift transmission in which one input shaft is driving in all uneven gear speeds and the other in all even gear speeds have, however, so far resulted in that only hydraulically operated multiple wet plate clutches have been used in combination with power shift transmissions.

The purpose of the present invention is to achieve an arrangement as described by way of introduction which makes it possible to use two dry plate friction clutches in combination with a transmission having two input shafts journalled concentric with one another, e.g. a power shift transmission or a hybrid engine transmission.

This is achieved according to the present invention by virtue of an arrangement having a first and a second release bearing one of which co-operates with the first friction clutch and the other one with the second clutch, and a mechanism arranged to apply an axial force to said first and second release bearings in order to disengage the clutches, at least one of said first and second release bearings being arranged to transmit an axial force via a first force transmitting mechanism to a third release bearing extending through a rotating element connected to the second clutch.

By means of the arrangement according to the invention, clutches can be used which have springs, or similar devices, to keep the clutches engaged during driving, thereby eliminating the need for a hydraulic pump applying a hydraulic pressure to keep hydraulic clutches engaged during all driving condition so that the over-all efficiency of the vehicle drive line is increased.

BRIEF DESCRIPTION OF THE DRAWINGS

The invention will be described in more detail with reference to the accompanying drawings, wherein.

DETAILED DESCRIPTION OF THE INVENTION

Figure 1:
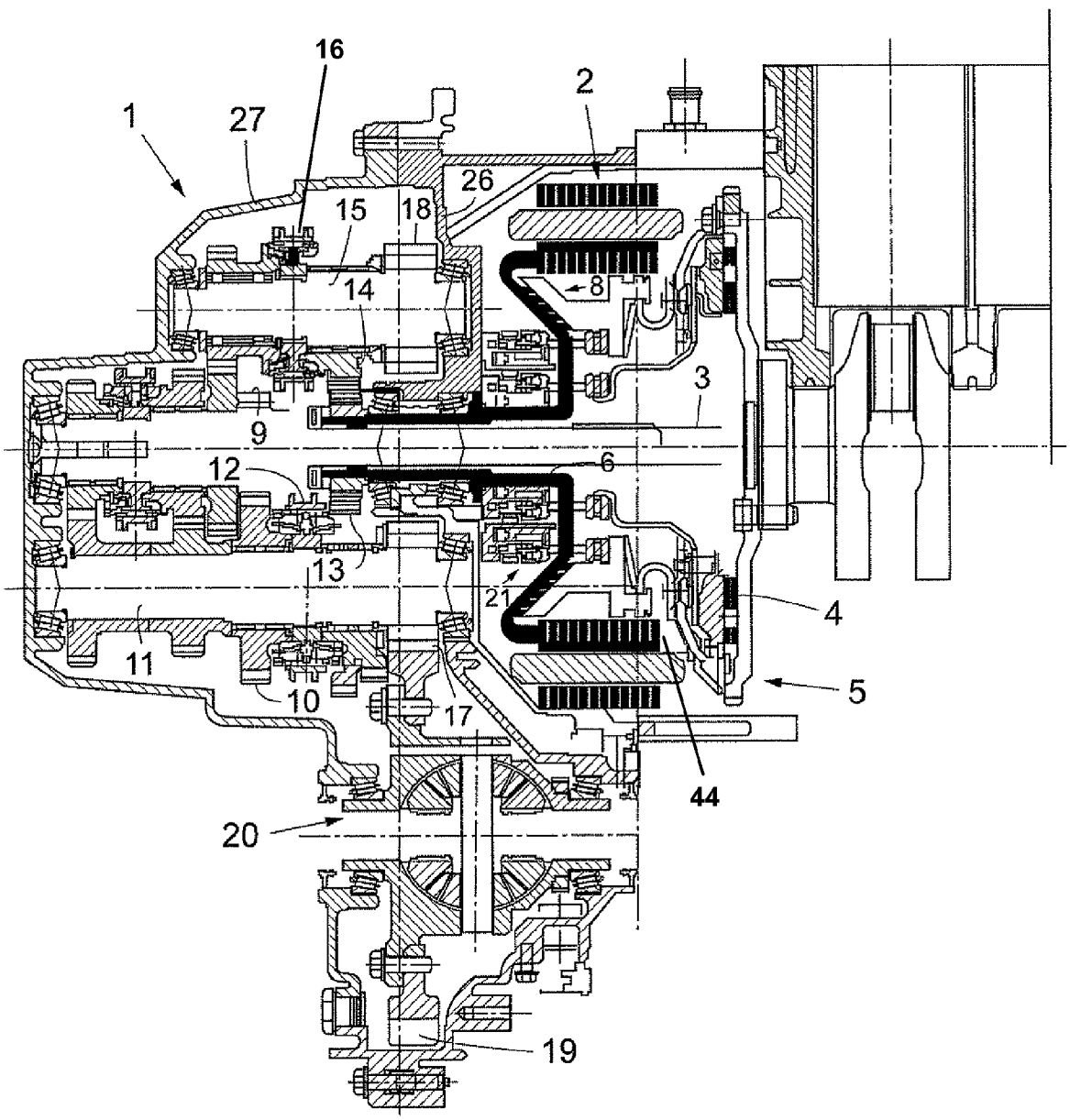
FIG. 1 shows a longitudinal section through a gearbox having two concentric input shafts and two dry plate clutches.
Figure 2:
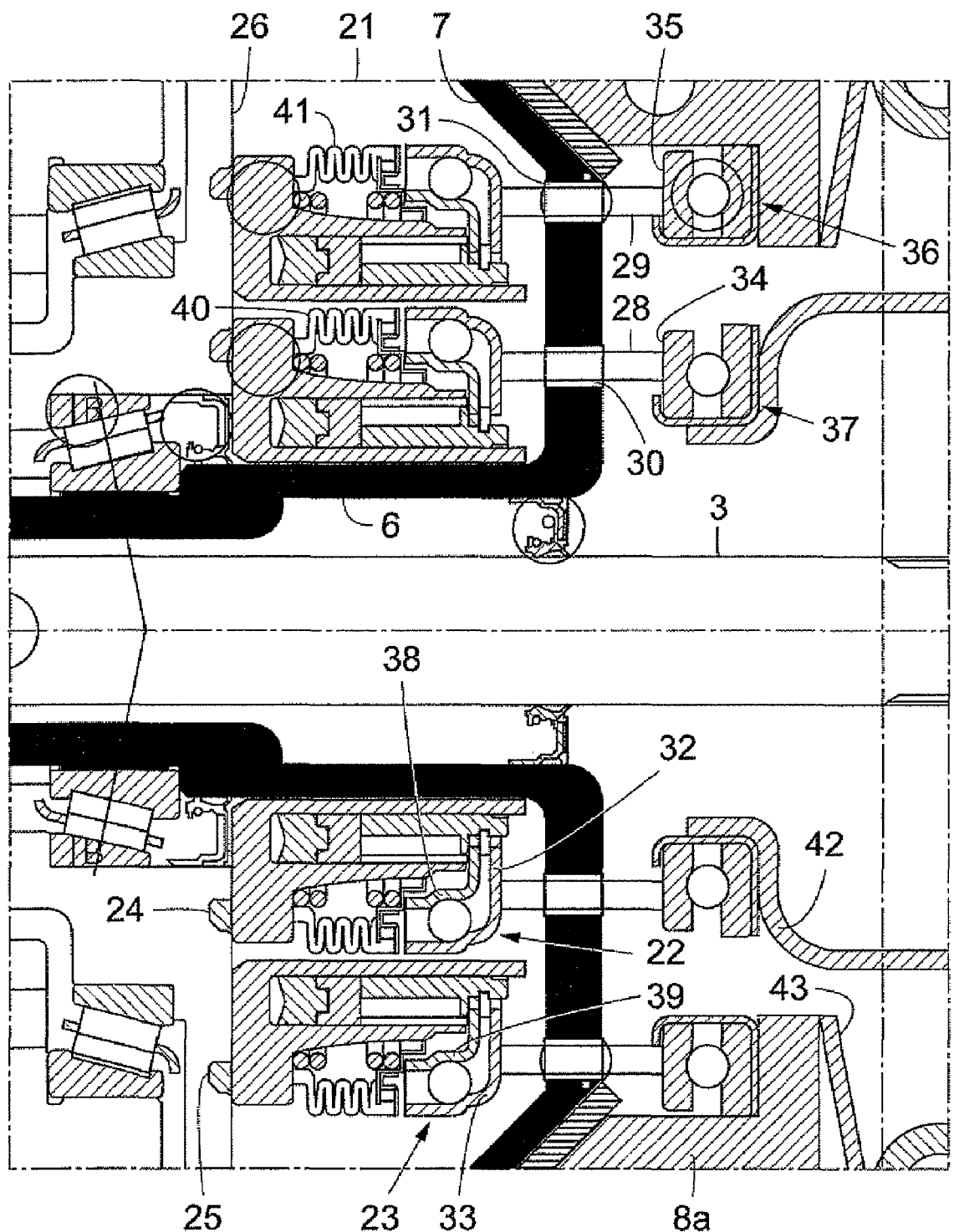
FIG. 2 shows an enlargement of the center portion of the gearbox in FIG. 1.

FIG. 1 shows a gearbox generally designated 1 which has a basic layout previously known, and which in addition has been provided with an electric machine 2. The gearbox 1 has a first input shaft 3 connected to a friction plate 4 of a first dry plate friction clutch generally designated 5 and a second input shaft 6 which is a hollow shaft journalled concentric with the first input shaft 3. The second input shaft 6 is connected to a conical element 7 of a second friction clutch generally designated 8 which has a conical friction element 8a connected to the first input shaft 3. A gear wheel 9 non-rotatably connected to the first input shaft 3 meshes with a gear wheel 10 which is rotatably journalled on a first countershaft 11 and which is lockable on the countershaft 11 by coupler 12. A gear wheel 13 non-rotatably connected to the second input shaft 6 meshes with a gear wheel 14 which is rotatably journalled on a second countershaft 15 and which is lockable on the countershaft 15 by a coupler 16. An output gear wheel 17 on the first counter shaft 11 and an output gear wheel 18 on the second counter shaft 15 are non-rotatably connected to the counter shafts 11 and 15, respectively, and meshes with a crown wheel 19 of a differential generally designated 20.

An arrangement for controlling engagement and disengagement of the first dry plate clutch 5 and the second dry plate clutch 8 is generally designated 21. This arrangement comprises first and second release bearings 22 and 23, respectively. The first and the second release bearings 22 and 23 are supported on first and second release bearing bases 24 and 25 which are rigidly mounted on a wall 26 of the gearbox housing 27. The release bearings 22 and 23 are each provided with a number of push rods 28 and 29, respectively, for example three in number, which are evenly peripherally distributed around the rotational axis of the shafts 3 and 6. The push rods 28 and 29 extend through openings 30 and 31 in the conical element 7 of the second friction clutch and are rigidly secured to outer bearing rings 32 and 33, respectively, of the release bearings 22 and 23. The outer ends of the push rods 28 and 29 bear against bearing rings 34 and 35, respectively, of a third and a fourth release bearing 36 and 37, respectively.

Inner bearing rings 38 and 39, respectively, of the release bearings 22 and 23 are axially slideably supported on the bearing bases 24 and 25. By means of hydraulic ring piston units 40 and 41, respectively, the release bearings 22 and 23 can be forced away from the gearbox housing wall thereby, via the push rods 28 and 29, biasing the third and fourth release bearings 36 and 37 towards spring elements, such as diaphragm springs, 42 and 43, respectively, of the first and the second clutch 5 and 8, thereby disengaging their respective clutch. When not activated by hydraulic pressure the ring pistons 40 and 41 are in a rest position in which the spring elements 42 and 43 keep their respective clutch in its engaged position.

By means of the arrangement described above the clutch 5 can be disengaged independently of the rotational speed of the element 7 of the second clutch 8. In the embodiment shown in FIG. 1, in addition to being a component of the second clutch 8, the element 7 also serves as a carrier of the rotor 44 of the electric machine 2.

In a common power shift transmission having two friction clutches of the same type, e.g. similar to the clutch 5, only the clutch closest to the engine needs two release bearings with a push rod arrangement between them provided that the clutch closest to the transmission has an axially displaceable pressure plate on that side which is adjacent to the transmission.

The invention claimed is:

1. An apparatus for controlling clutches in a transmission comprising:
    a first dry plate friction clutch (5) driveably connected to a first transmission shaft (3) and a second dry plate clutch (8) driveably connected to a second transmission shaft (6) journalled concentric with and surrounding the first transmission shaft;
    first and second release bearings (22,23) cooperating respectively with the first friction clutch and the second friction clutch;
    a mechanism (40,41) arranged to apply an axial force to said first and second release bearings in order to disengage the clutches; and
    wherein at least one of said first and second release bearings are arranged to transmit said axial force to a third release bearing (37) via a first force transmitting element (28) extending through a rotating element (7) connected to the second clutch.

2. An apparatus according to claim 1 wherein the other of said first and second release bearings is arranged to transmit said axial force to a fourth release bearing (36) via a second force transmitting element (29) extending through said rotating element (7).

3. An apparatus according to claim 1 wherein said mechansim (40,41) arranged to apply an axial force to said first and second release bearings (22,23) comprises first and second hydraulic piston-cylinder devices.

4. An apparatus according to claim 1 wherein said rotating element (7) is a disc shaped element arranged to transmit rotational force from a driving source (2) via the second clutch (8) to the second transmission shaft (6).

5. An apparatus according to claim 4 wherein said first and second force transmitting elements (28,29) are push rods extending through openings (30,31) in the disc shaped element (7), said push rods being evenly distributed around the rotational axis thereof.

* * * * *